April 19, 1966 H. O. SELTSAM 3,246,872
SEAT CUP
Filed Aug. 20, 1962 5 Sheets-Sheet 1
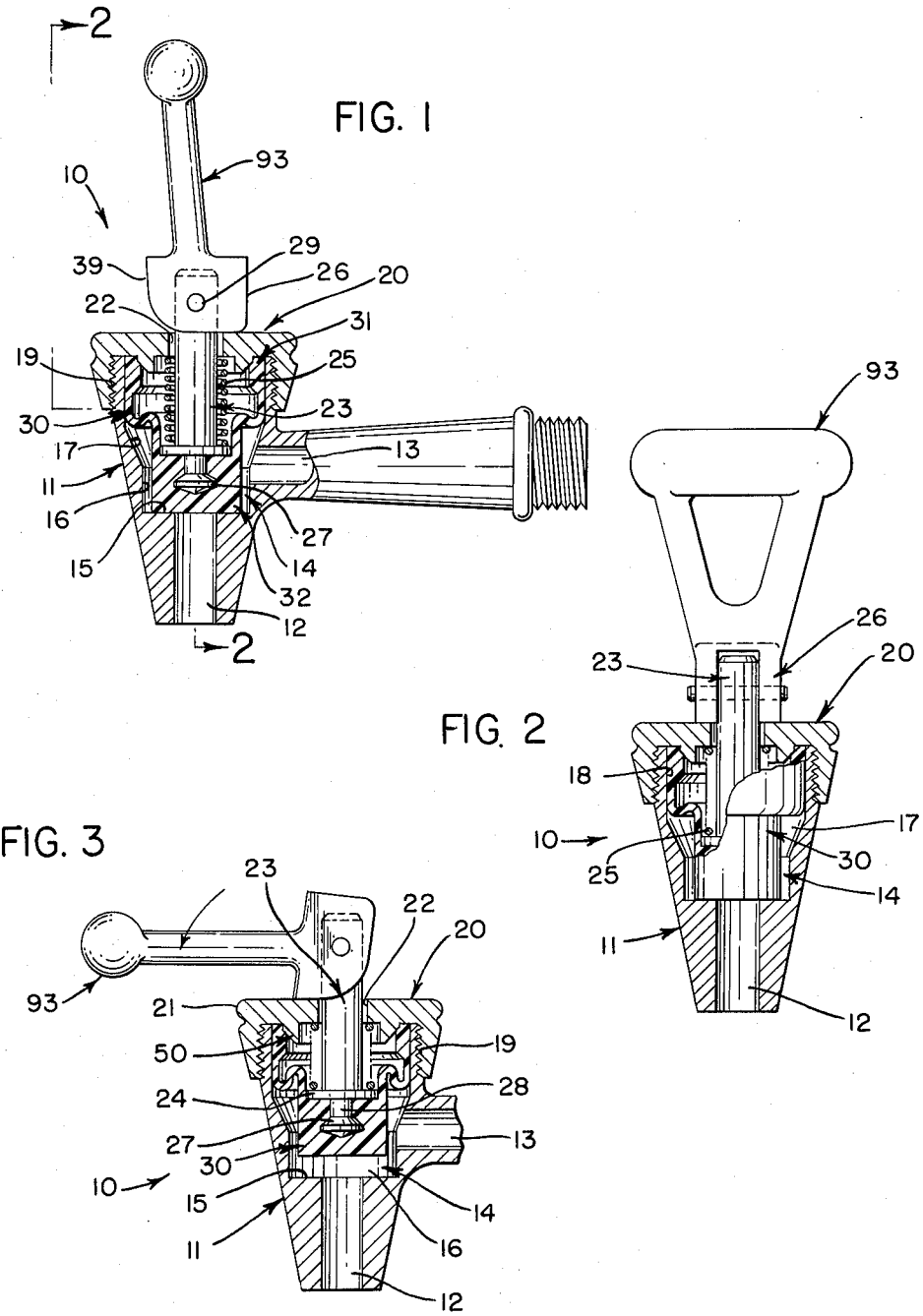
INVENTOR.
HAROLD O. SELTSAM
BY
*Fay & Fay*
ATTORNEYS April 19, 1966 H. O. SELTSAM 3,246,872
SEAT CUP
Filed Aug. 20, 1962 5 Sheets-Sheet 2
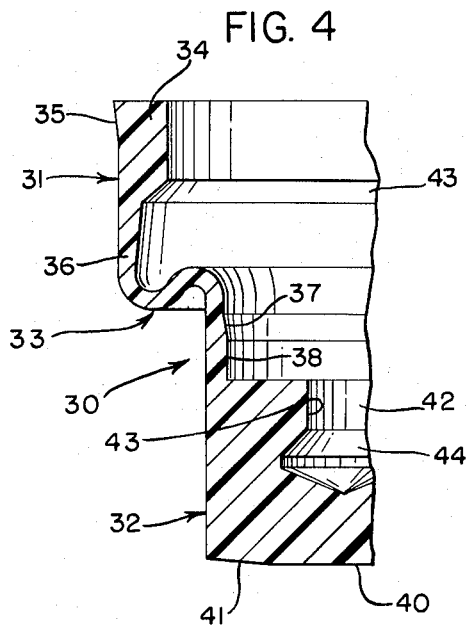
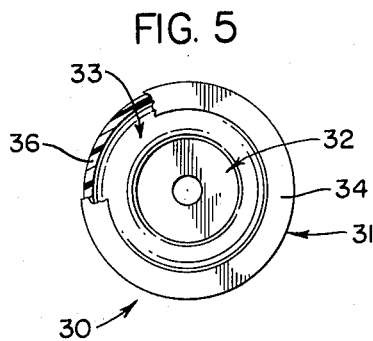
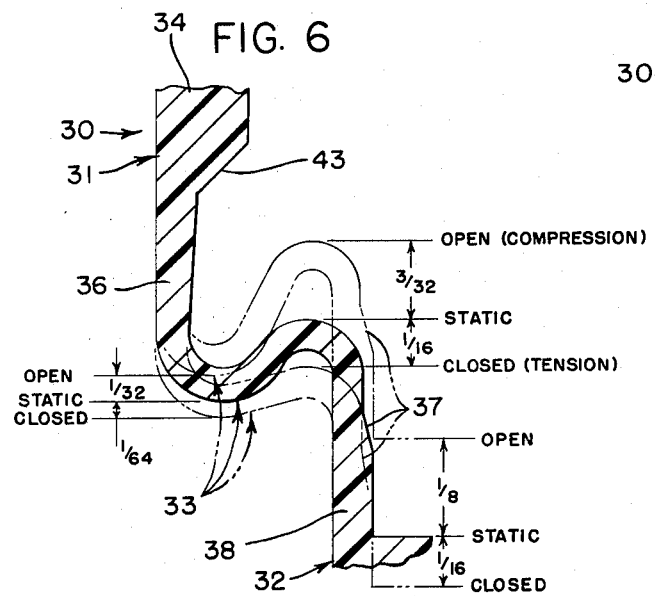
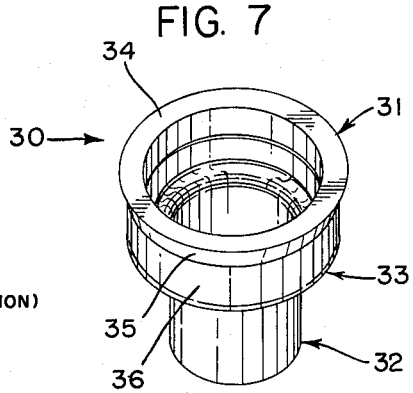
INVENTOR.
HAROLD O. SELTSAM
BY
*Fay & Fay*
ATTORNEYS April 19, 1966 H. O. SELTSAM 3,246,872
SEAT CUP
Filed Aug. 20, 1962 5 Sheets-Sheet 3

INVENTOR.
HAROLD O. SELTSAM
BY
*Fay & Fay*
ATTORNEYS

April 19, 1966     H. O. SELTSAM     3,246,872

SEAT CUP

Filed Aug. 20, 1962     5 Sheets-Sheet 4

INVENTOR.
HAROLD O. SELTSAM
BY
Fay & Fay
ATTORNEYS

April 19, 1966  H. O. SELTSAM  3,246,872
SEAT CUP
Filed Aug. 20, 1962  5 Sheets-Sheet 5

INVENTOR.
HAROLD O. SELTSAM
BY
*Fay & Fay*
ATTORNEYS 3,246,872
SEAT CUP
Harold O. Seltsam, Rocky River, Ohio, assignor to Tomlinson Industries, Inc., Cleveland, Ohio, a corporation of Ohio
Filed Aug. 20, 1962, Ser. No. 217,954
1 Claim. (Cl. 251—331)

This invention relates to a novel valve in general and more specifically is directed to a valve construction embodying a novel sealing means. The particular valve here involved and the novel sealing means which forms an integral part of the valve assembly have found a particularly successful application in the liquid food dispensing industry but are by no means restricted to such applications.

For ease of description the sealing means will be referred to hereinafter as a seat cup. The name is a derivative of the structure and function of the member as applied to the valve art. The seat cup acts against a valve seat and is of a cuplike configuration, which is a distinguishing characteristic.

Seals of this general type are commercially available in various sizes and designs. Among the variety of types that are available, one particularly has proved to be of considerable commercial consequence. This type includes a tubular base portion, a coaxial tubular nipple portion of reduced cross-sectional dimension with respect to the base portion, and a substantially radial transverse shoulder interconnecting the base and the nipple portion. This assembly forms an upwardly opening chamber, generally resembling that of a cup. The tubular nipple portion terminates in a surface transverse to the axis of the cup, thereby providing a free end which, as will become apparent hereinafter, provides a portion which is adapted sealingly to co-operate with a valve seat.

When a seat cup of the prior art design is operatively carried in the seal chamber of a valve, the base portion is held against substantial axial and lateral displacement relative to the valve body in a position aligned with, but removable from, the valve seat. The nipple portion extends from the base portion toward the valve seat, and at its free end engages the latter to form a fluid-tight seal to control flow. Suitable means is employed to mount the nipple removably to the inner end of the reciprocal valve stem, which is aligned with the valve seat. Upon axial movement of the stem away from the seat, the nipple portion is partially retracted and, due to the flexure at the transverse shoulder portion, telescopes within the base portion. Such retraction results in breaking the seal at the valve seat, thereby permitting flow through the valve. On counter movement of the stem, the sealing engagement between the valve seat and the free end of the nipple portion is re-established and flow is thereby terminated.

Over the years, seat cup seals of the foregoing design have established an admirable record of performance under rather demanding circumstances; however, one particular problem has been of continual paramount concern to manufacturers. It has been found that over periods of extended use, there is a marked tendency towards failure of the transverse shoulder, and particularly in that zone thereof which joins the tubular base portion.

One of the main factors influencing failure has been traced to fatigue of the material. Under the existing state of technology, a material found most appropriate for use in this application is a silicone elastomer having a durometer hardness of from about 30 to about 60 points, with a hardness of about 40 to 50 points being preferable. The particular elastomer having proved quite satisfactory in all other respects, and the durometer of necessity being within the limits defined to maximize effective sealing, a change of material is not indicated. However, any material possessing the essential properties would be appropriate in this application. Thus, the elimination, insofar as possible, of fatigue causation is deemed to be most feasible approach to a satisfactory solution to the problem.

The fatigue problem is best described with an example. A wire may be bent or flexed sharply a number of times until the bond between the molecular structure is weakened, resulting in the separation of the wire. If the flexure is slight, a considerably larger number of cycles of bending are required before the wire will ultimately fail.

This theory is somewhat applicable to elastomeric materials also. If the flexure or stretching can be kept at a minimum, the useful life of the elastomer can be greatly increased. Moreover, the fatigue life is further favorably influenced by an incomplete relaxation of the elastomer, although the theoretical reasons for such are yet unknown.

A further consideration in the fatigue problem of the conventional cup is the excessive stretching at one point in the zone of the transverse shoulder on initial upward movement of the valve stem. The stem, through about the first third of its travel, is not completely linear, but nutates slightly about a point in the cover of the valve assembly. As a consequence, on opposite diameters in the plane of nutation, the elastomeric seat cup is stretched and compressed in the zone of the transverse shoulder resulting in additional uneven flexure. The additional flexure, added to the flexure induced by the telescoping of the nipple into the base portion, serves further to reduce the life of the conventional seat cup.

The present design broadly contemplates the general elements defined with respect to the prior art device in that it contemplates a tubular base portion and a nipple portion. However, the transverse shoulder portion, in one embodiment of the invention, has been molded to approximate a sinusoidal shape in cross section, and a portion of the tubular base has been relieved in the zone adjacent the intersection of the transverse shoulder portion an amount approximately one-half the axial distance of the tubular base portion.

The present seat cup in the installed state has an overall axial dimension somewhat shorter than the prior art device. In practice, this is held to be lesser in axial dimension by about one-third of the expected maximum travel of the valve stem. As expected, when the seat cup is inserted in the valve body, the free end of the nipple portion does not rest on the sealing seat until the valve stem is inserted, at which time the valve stem flexes the transverse shoulder portion downwardly about one-third of the overall axial travel of the stem, thereby preflexing the transverse shoulder. When the valve is opened an amount equal to about one-third of full open, the transverse shoulder portion of the seat cup passes into the unflexed or free state, and when full open, the shoulder is flexed only by about two-thirds of the amount of prior art devices. The preflexed design, coupled with the relieving of the tubular base portion, minimizes shoulder stretching and allows a more perfect rolling action of the transverse shoulder on nipple retraction. The strain attendant with that degree of stretching which does occur is considerably less than prior art devices, thereby favorably reducing fatigue. These factors result in materially longer life of the seat cup with a more uniform sealing pressure being maintained. Adjustability of the novel seat cup is available so that rotation of the cap portion a few turns will adjust the pressure on the free end portion, thereby accommodating slight variations within tolerances in the length of the stem. The complete operation and remarkable advantages of the invention will be better understood from the full description set forth below.

It is, therefore, an object of this invention to provide a new and improved valve assembly.

It is a further object of this invention to provide a novel valve assembly including a novel seat cup sealing member characterized by increased length of useful life.

It is a further object of this invention to provide, apart from the valve itself, a novel design for a seat cup sealing member.

It is a still further object of this invention to provide a seat cup sealing member of the type described wherein rolling of the transverse shoulder can be achieved on flexing of such member.

It is a still further object of this invention to provide a novel seat cup sealing member of the type described wherein the magnitude of flexing or strain imposed on the various parts of the member will be materially less than prior art devices.

It is a still further object of this invention to provide a novel seat cup which is relieved in the proper places so as to be unaffected adversely by nutations attendant to such valve operation.

It is a still further object to provide a novel valve assembly which will minimize strain in the seat cup employed therein.

Other and fuller objects will become readily apparent when reference is made to the accompanying drawings, wherein:

FIG. 1 is an elevational view of a valve embodying the principles of the instant invention with parts of the seal chamber and seat cup in section;

FIG. 2 is a front elevational view taken along the line 2—2 of FIG. 1;

FIG. 3 is a view similar to FIG. 1 with the free end of the seat cup raised off the sealing seat;

FIG. 4 is a fragmentary cross-sectional view of the seat cup;

FIG. 5 is a plan view of the seat cup;

FIG. 6 is an enlarged fragmentary view in section of the seat cup, with phantom lines to illustrate the configuration of the transverse wall in the open and closed positions;

FIG. 7 is a schematic view of the seat cup;

Figure 8:
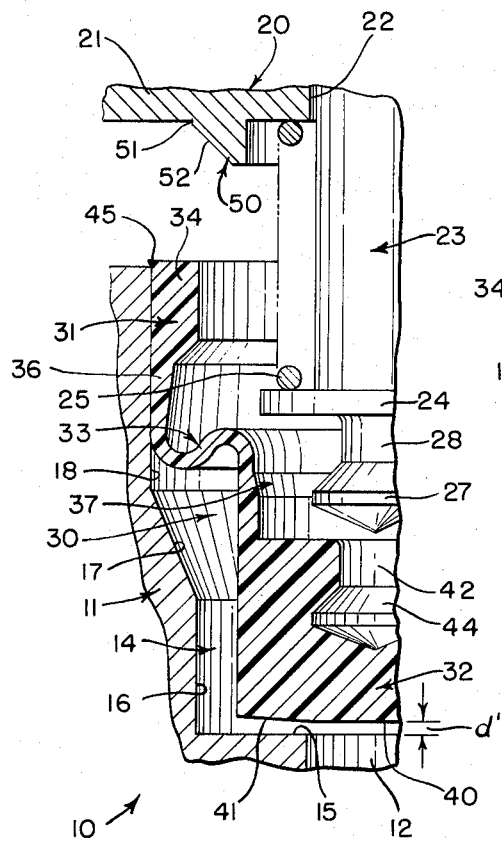
FIG. 8 is an enlarged fragmentary view of the seat cup inserted in the sealing chamber prior to insertion of the stem in the cap member.

Referring now to FIG. 1, a valve assembly is illustrated, indicated generally at 10. The valve assembly 10 comprises a body 11 having an outlet 12 and an inlet 13. A fluid passageway 14 is provided in the valve body 11, the former being in communication with outlet and inlet portions 12 and 13, respectively.

The passageway 14 comprises a sealing seat 15 which is oriented transversely of the axis of the outlet 12. Approximately coaxial with the outlet 12 and joining the seat 15 is a cylindrical portion 16 which merges into a frusto-conical portion 17, and thence into an enlarged cylindrical portion 18. The portions 16, 17 and 18 cooperate collectively to form a seal receiving chamber. The body is threaded on its outer periphery at its upper extremity 19 to receive a threaded cap assembly 20.

The cap assembly comprises a bonnet member 21 having a central opening 22 slidably to receive a stem means 23. The stem 23 has a collar 24 which provides an abutment for a compression spring 25 on one end. The opposite end of the spring 25 abuts the bonnet member 21 normally to urge the stem toward seat 15. A handle 93 is attached to the stem by suitable pivot pin means indicated at 24. The handle has an arcuate cam portion 25 having a flat 26 for purposes hereinafter to be described.

For purposes to be later described, the stem 23 has a knob 27 at its lower extremity, which is joined to the stem by a reduced cylindrical portion 28.

The particular detail of the seat cup and its relationship to the valve is of utmost importance, and will be more specifically described with respect to FIGS. 4 through 9. As is best seen in FIG. 3, the handle 93, when rotated counterclockwise about its pivotal axis, causes relative sliding between the bonnet 21 and the cam surface 39 such that when the position as shown in FIG. 3 is reached, the stem reaches its most remote position from seat 15. It is obvious upon inspection of FIG. 3 that when the handle is released, the spring serves to force the stem in the opposite direction, thereby returning the handle 93 to the vertical position shown in FIG. 1. It can be appreciated that if the handle 93 is rotated in a clockwise manner so as to bring the flat 26 into engagement with the bonnet, the valve will remain open, freeing both of the operator's hands. In such cases the stem remains retracted until manual force is exerted on the handle to unlock the stem and permit the spring to close the valve. Thus, it can be seen that the handle can be rotated so that the valve will automatically close if the cam surface 39 is used or, in the event continuous flow is desired, the flat 26 may be utilized to lock the valve in the open position.

Turning now to FIGS. 4 through 7, the seat cup valve component 30 is composed broadly of three major portions: a tubular base portion 31, a tubular nipple portion 32 coaxial with the base, and a transverse shoulder portion 33 which joins the base portion to the nipple portion.

More specifically, the tubular base portion comprises a generally cylindrical section 34 of substantial thickness. The outer periphery of the base at its free end portion is flared on a slight angle as at 35 to form an external locator ridge for purposes hereinafter to become apparent. The cylindrical section 34 is reduced in diameter by a frusto-conical shoulder 43 which merges with a web 36 of about the same thickness as the transverse shoulder portion 33. As seen, the web 36 joins the base 31 to the transverse shoulder, the latter being, in cross section, of general sinusoidal configuration in the illustrated form.

The transverse shoulder portion 33 is joined to the nipple portion 32 by a frusto-conical portion 37 leading into a wall portion of increased thickness as at 38 which is substantially cylindrical. A transverse end wall closes the nipple portion and provides the same with a free end 40 having a lightly chamfered external peripheral surface as shown at 41. A recess 42 is provided internally of the end wall having a conformation to be removably snap fitted upon the knob 27 and the reduced cylindrical portion 28 of the stem 23. The latter construction provides for effortless replacement of the seat cup when desired, without the necessity of replacing the stem assembly as well.

Figure 9:
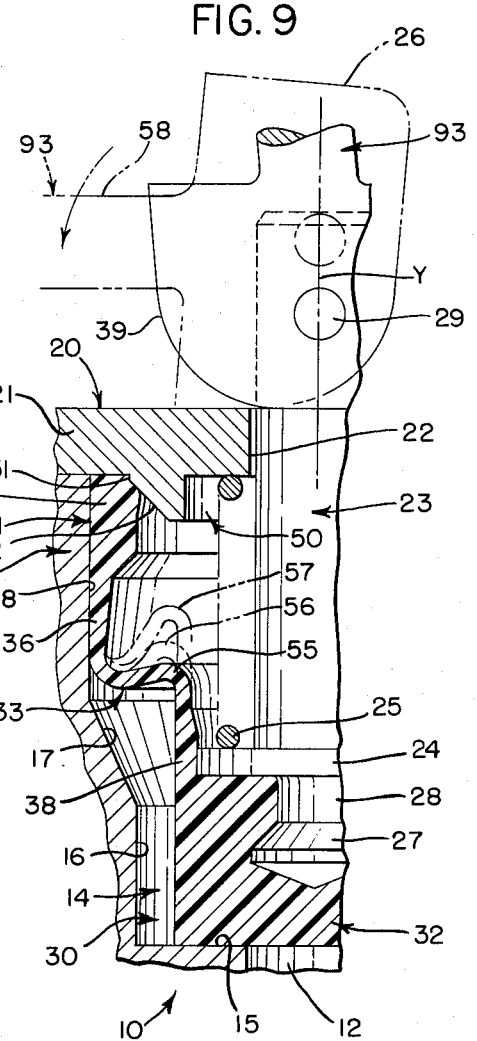
FIG. 9 is an enlarged view similar to FIG. 4 with the cap member placed on the valve body.

With particular reference to FIGS. 8 and 9, the operation of the seat cup will now be explained. It will be noted that when the cup is inserted in the valve body 13, the base portion 31 engages cylindrical portion 18 with the flared outer periphery 35 acting as a locator means to limit the degree of insertion. If the seat cup were not mounted on the cap assembly prior to insertion into the body, and if the transverse shoulder portion were to remain in its free state, the free end 40 of the nipple portion 32 would be spaced from the seat 15 a distance equal to $d'$, as seen in FIG. 8. The base portion 31 extends slightly above the upper end of the body 13 as indicated at 45 to provide for axial adjustment of the bonnet, where required to obtain optimum stem positioning relative to seat 15.

The bonnet member 21 has an axially projecting expander 50 which on the outer periphery consists of cylindrical portion 51 and frusto-conical portion 52 providing a guide surface to center the cap with respect to the valve body and seat cup 30. In assembling the cap assembly 20 to the body portion 13, the stem is inserted with the knob 27 in the recessed portion 44, the fit being a snaplike action, since the cylindrical portion 42 must necessarily be expanded to allow the knob 27 to pass therethrough. The frusto-conical surface 52 on the axial extension 50 guides the cap member so as to align it concentrically with the body portion 13 and the seat cup 30. Additionally, the expander 50 co-operates with the cylindrical surface 18 of the passageway 14 to expand and grip the base portion 31 of the seat cup, as will be described with greater particularity.

The parts in the assembled position are shown fragmentarily in the enlarged view of FIG. 9. The respective diameter of the surface 51 is somewhat greater than the internal peripheral surface of the cylindrical portion 34, so that the base portion is compressed between the axial extension 50 and the surface 18 of body 13 to establish a sealing relationship between the base portion and the surface 18. As can be seen, where the parts of the cap assembly 20 are assembled with the body portion, the transverse shoulder portion 33, generally sinusoidal in the free state, is flexed to assume the more nearly flattened configuration shown at 55. This configuration results from the stem forcing the nipple portion away from the bonnet while the base portion 34 is maintained against substantial axial movement. The free state configuration and position is shown in phantom at 56 and the configuration of the transverse portion as shown in phantom at 57 when the valve is raised to full open, the handle at such time being in the position shown in phantom lines at 58.

An enlarged view illustrating the position of the transverse shoulder under the several conditions imposed in operation is shown more clearly in FIG. 6, with the identifying data for the conditions adjacent thereto. The respective conditions illustrated are theoretical, in that they do not take into consideration, the rolling and stretching action accommodated by the web 36 and frusto-conical portion 37, which join the sinusoidal shoulder portion 33 to the base 31 and nipple portion 32, respectively. It is to be emphasized that the action referred to above serves two basic functions in that it reduces the localization of flexure; i.e., the web 36 and frusto-conical portion 37, because of their relatively thin design, will flex along with the transverse shoulder portion 33. Secondly, during the travel of the stem slight rolling will occur at these relieved portions, which will reduce the overall amount of flexure necessary to accommodate stem travel. However, such action, while exceedingly favorable in securing optimum results in operation, is difficult to illustrate on a theoretical basis, so the identifying data of FIGURE 6 does not comprehensively treat the rolling and flexing action experienced by the web 36 and frusto-conical portion 37, during actual operation.

The respective dimensions of travel are by way of example only, for a commercial embodiment. However, it is felt that the relationship expressed by the dimension will hold generally true, regardless of the particular size, i.e., the downward flexing of the seat cup equalling about one-third of the total axial travel of the stem, ignoring rolling at the web 36 and frusto-conical portion 37. Thus, in opening, the stem will travel through the free state on about the first third of opening movement, and as it continues to full open, the seat cup will flex and roll at the transverse shoulder portion to compensate for the amount of stem travel. At full open, the shoulder is reflexed at its maximum a distance beyond the free state of about two-thirds the stem travel.

The phantom lines indicate the respective position of the web 36 and frusto-conical portion 37 at the closed and open positions. On inspection of the embodiment, by those skilled in the art, it is apparent that the relieved portions serve the important functions noted above. This will become more clearly apparent on comparison with a prior art model hereinafter.

The above theoretical relationship of the movement of the transverse shoulder may be thus represented by a mathematical approximation. The greatest distance the shoulder portion moves with respect to its free state position is approximately equal to two-thirds the total travel of the stem, or $E_o = 2r/3$ where $E_o$ is the greatest distance the shoulder portion moves beyond its free state position when the valve is open, and $r$ is the total reciprocal movement of the stem from valve open to valve closed position.

A further expression is available to define the relationship at closing which is arbitrarily represented by $E_c$. It has been found that $E_c$ is approximately equal to the maximum travel of the stem divided by 3. In equation form $E_c = r/3$ where $E_c$ is the greatest distance the shoulder portion moves beyond its free state position when the valve is closed, and $r$ is the total reciprocal movement of the stem from valve open to valve closed position.

From this relationship it is obvious that the relationship could be redefined with the integers being replaced by algebraic representations of constants. In equation form $E_o = r/a$ and $E_c = r/b$ where $a$ and $b$ represent constants. This relationship thus could lead one to flexing the transverse shoulder portion an equal amount in the two positions, opened and closed, with the intermediate position being the free or unflexed state.

However, in practice, the valve remains in the closed position for substantially longer periods; therefore, it is advantageous to understress the transverse shoulder in the closed position with respect to the full open position, in order to maximize the life of the seat cup. It is felt that the most satisfactory relationship of the limits will be dictated by the enviromnent and conditions of the anticipated use.

In one concrete embodiment, as shown in FIG. 8, the free end 41 of the nipple portion, if inserted into the seal chamber, without stressing in the area of the transverse shoulder, would be approximately about $\frac{1}{16}$ inch off the seat 15, or $d'$ would be equal to about $\frac{1}{16}$ inch. Upon insertion of the stem, and in the closed position, as shown in FIG. 9, the free end of the nipple portion would be forced against the valve seat 15 with a sealing force which may be adjusted slightly, by merely rotating the cap assembly 20. It can be appreciated that, upon raising the stem the first $\frac{1}{16}$ inch of travel, such action brings the seat cup back to the free state wherein the transverse wall portion is generally sinusoidal, as shown in the solid lines of FIG. 6. Continuing to full open, the transverse wall portion assumes substantially a sinusoidal construction; however, the amplitude is increased by approximately two-thirds the amplitude of that in the free state. It thus can be seen that the maximum overall flexure has been reduced by about one-third that occasioned with respect to the prior art devices.

The nutation which occurs in the first one-third of stem travel does not serve to overstress the transverse wall portion, since, during such travel, the wall portion is transcending from a slightly flexed state to a "no flexed" state. Thus, any flexure induced by nutation of the stem will be accommodated by a slight flexing and rolling in the plane of nutation with no adverse effect on the transverse wall portion. The advantages of the instant device will become more evident when the prior art is discussed below.

Figure 10:
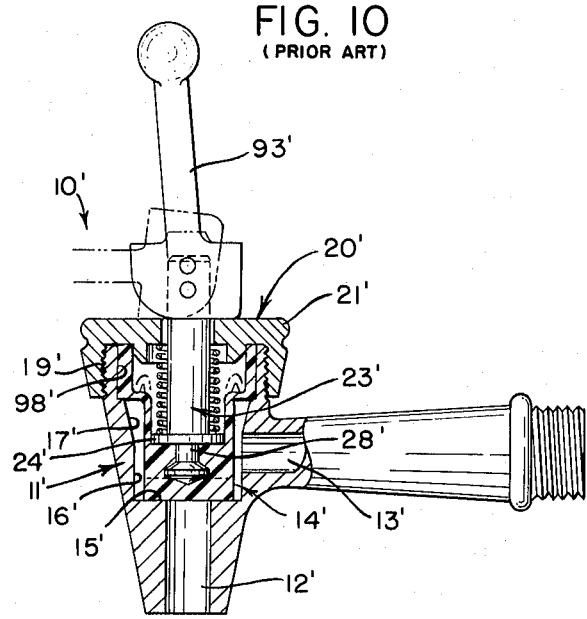
FIG. 10 is an elevational view with parts in section of a prior art valve and seat cup similar in construction to that of FIG. 1.
Figure 12:
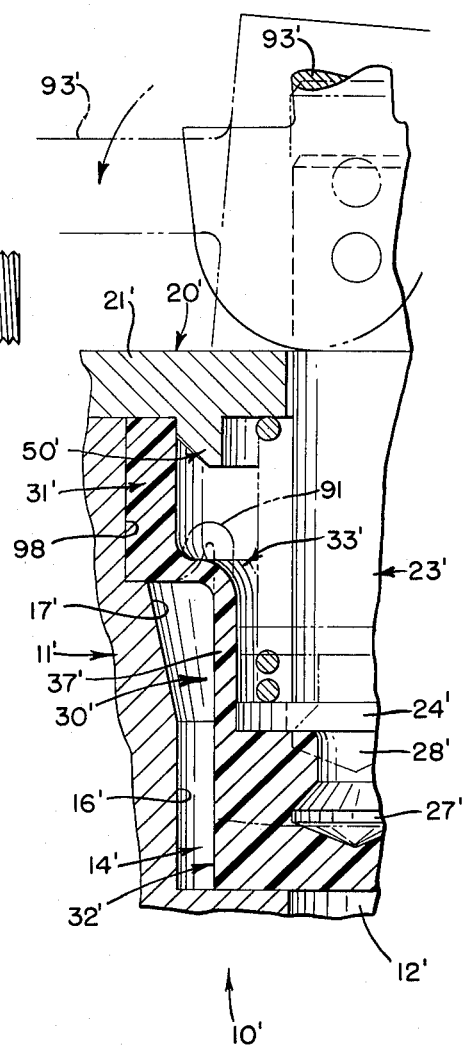
FIG. 12 is an enlarged view of an assembled valve employing a prior art seat cup and showing in phantom lines the position of the transverse wall in the open position.
Figure 11:
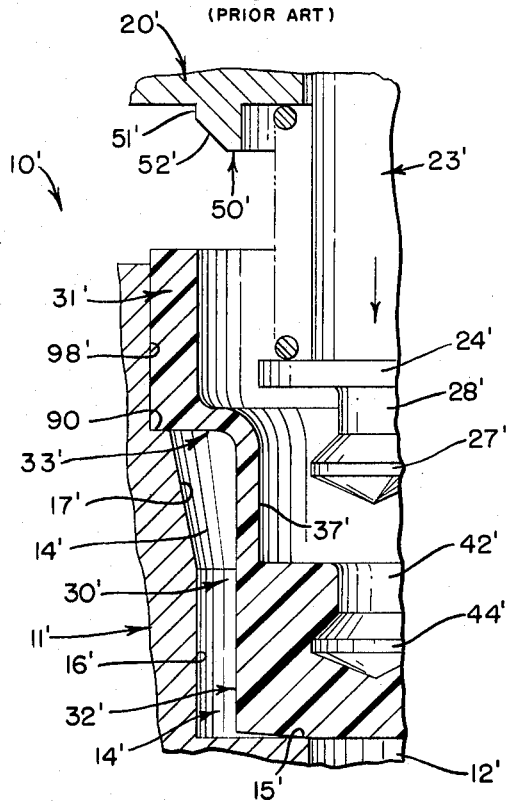
FIG. 11 is an enlarged elevational view in section of the prior art seat cup of FIG. 10 similar to the conditions of the novel valve assembly of FIG. 8.

Referring now to FIGS. 10 through 12, herein is disclosed a prior art model in a valve arrangement similar to the instant invention. For convenience of comparison, reference characters identical to the reference characters of FIG. 1 with a prime (') attached will be used to identify corresponding elements.

The valve 10' comprises a body 11', an outlet 12' and an inlet 13'. Transversely of the outlet 12' is a seat 15'. A passage 14' joins the outlet 12' to the inlet 13'. The valve body 11' houses the passage 14' which is comprised of cylindrical portion 16', frusto-conical portion 17', and counterbored portion 98'. Suitable thread means 19' is provided on the exterior of the body threadably to receive the cap assembly 20'. The cap assembly is similar to the cap assembly shown in the embodiment of FIG. 1 in that it comprises a bonnet 21', handle means 93', stem means 23', having a collar 24' at the lower extremity, reduced cylindrical portion 28', and a knob 27' at the terminus point of the stem. The seat cup 30' is comprised of a nipple portion 32' joined by a flexible web portion 37', which merges into a transverse shoulder 33', thence into base portion 31'. The base portion is generally cylindrical in configuration, terminating in radially extending shoulder 33', which turns arcuately into the web portion 37' and is connected to the nipple portion 32'. The nipple portion is provided with a knob-receiving aperture 44' and cylindrical portion 42' to receive the complementary parts on the stem, shown fragmentarily thereabove. The seat cup is inserted into the passageway 14' until the nipple portion 32' engages the seat portion 15'. The radial shoulder 33' engages the counterbored portion 98' on the shoulder 90', thereby limiting the depth to which the base portion 31' may be inserted. The seat cup is snapped over the stem in the same manner as the instant device; that is, the knob is forced through the reduced cylindrical portion 42' into the knob receiving aperture 44' so that the nipple portion grips the knob 27' so as to travel therewith.

The bonnet, having expander 50' with frusto-conical surface 52' and cylindrical surface 51', is threadedly received on the body portion, as is best seen in FIG. 12. The base portion 31' is thereby clampingly received between the shoulder 90' and the bonnet, thereby increasing its radial thickness when the cap 21' is threadably attached to the body portion 13'. When the stem is raised, as shown in phantom lines in FIG. 12, the seat cup assumes, at the radial shoulder, a configuration shown in phantom lines at 91'. From this configuration it can be seen that the maximum stretching of the shoulder must be equal to the length of the stem travel, or, for example, if the stem travel is 3/16 inch, the seat cup must stretch 3/16 inch, folding as indicated at 91'. Such yield approaches the elastic limit by approximately one-third more than would be true with respect to the instant embodiment ignoring the rolling action thereof, thus causing a shorter fatigue life than in the present case. However, it must be borne in mind that with respect to elastomeric materials, such as the silicon rubber which has found satisfactory use in commercial embodiments, stress is not directly proportional to strain. The stress-strain curve for rubber on retraction does not follow the same course as during the extension but forms a hysteresis loop. On successive extensions and retractions, the areas of the successive loops diminish to a minimum, thus showing a corresponding decrease in hysteresis.

Figure 13:
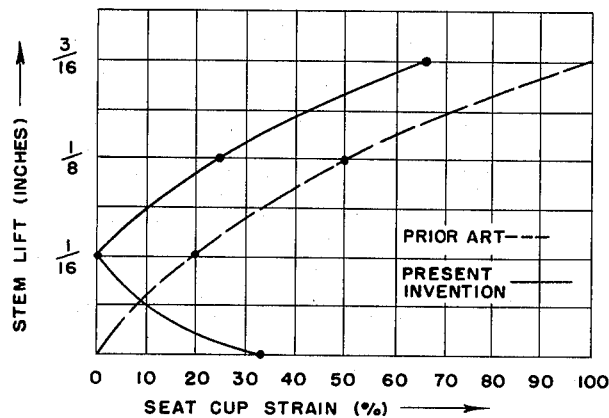
FIG. 13 is a graphical representation showing the relationship of stem travel versus seat cup strain.

Referring now to FIG. 13, therein is shown a graphical representation of the stem lift in inches versus the seat cup strain in percent, with the curves representing the prior art and instant invention. The stem lift is indicated in inches along the Y axis, the normal stem travel being about 3/16 inch. The seat cup strain in percent is referenced to the prior art device shown, the prior art device having 100 percent strain at full stem travel. It can be seen, again ignoring rolling, that the novel embodiment employing the improved seat cup, which is preflexed, will have in the closed position slightly in excess of 30 percent strain thereon. As the stem lifts, at 1/16 inch the strain is theoretically zero, and through the next 2/16 inch, the strain rises to about 65 percent. The prior art device starts, in the closed position, with zero strain. However, for the 3/16 inch travel, it increases up to 100 percent. This comparative graph shows that, with respect to prior art devices, approximately one-third less strain is experienced by the instant seat cup design at full open, and under equivalent conditions. Such difference is of substantial magnitude and gives rise ultimately to a much longer seal life. In the comparative analysis depicted by FIG. 13, it has been assumed that the instant embodiment will be subjected to pure strain to accommodate stem travel. However, as heretofore noted, the relieving of the base member permits slight rolling, and further minimizes strain or stretching. Thus, in actual practice the seat cup strain will be substantially less than 66 percent of that of the prior art, which has its base portion fixedly held so the transverse shoulder must yield to accommodate all movement.

Figure 14:
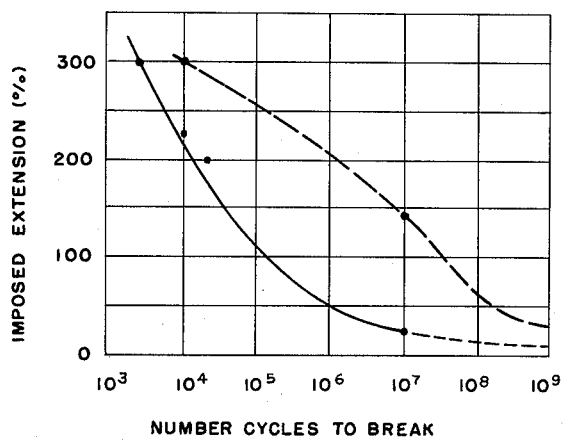
FIG. 14 is a graphical representation of the imposed extension in percent versus the number of cycles to break.

FIG. 14 is a theoretical representation of the imposed extensions in percent versus the number of cycles to break. For example, if a one inch elastomer were extended to 1¼ inches, or 25 percent of its total length, it would require $10^7$ cycles to cause failure of such elastomer. It will be appreciated that the prior art device described previously requires, in comparison to the cup of this invention, on the order of 1/16 inch more maximum extension on each cycle of operation. In practice this would amount to about one-third increase in the percentage of flexure. Since the curve approaches the X axis asymptotically, slight variations in the lower percentage ranges will materially increase or decrease the number of cycles to break. For example, in one concrete embodiment the percent of elongation was lowered from about 15 to about 10 percent. This theoretically would increase the expected life of the instant device by about 10 times. For purposes of this discussion, the rolling of the transverse shoulder portion has again been omitted; however, it is important to note that the rolling action will serve to reduce the percentage of elongation while kneading the rubber to keep it soft and pliable over the years.

The curve shown in dotted lines on FIG. 14 is included to show theoretically the influence of an incomplete relaxation on an elastomer. It is emphasized that this beneficial effect is not amenable to theoretical treatment at this time, such data being derived experimentally. It is only possible to estimate a lower limit for fatigue life when the rubber is not relaxed to zero strain on each cycle. It is felt that this beneficial effect is achieved in the instant device by having the seat cup under stress in both the open and closed positions. A complete relaxation will not be had, since the elastic properties will lag the stem travel on opening. It is thought that the zero strain condition will merely be passed through on each cycle without allowing a complete relaxation of the elastomer.

The theoretical treatment of the device has been added in an attempt to effect a complete understanding of the operation and advantages of the instant invention. Although various dimensions and concrete examples have been used, it is not intended that this be limiting since such has been done in the interest of ease and completeness of description. It is intended that the scope of the invention be defined by the spirit and scope of the appended claim.

I claim:

A resilient seal adapted for controlling the flow of fluid through a valve comprising:

an elongated tubular base portion having a free end;

said base portion having a substantially uniform cylindrical external periphery over substantially its entire length;

an elongated tubular nipple portion concentric with the base portion and having a reduced cross sectional dimension relative thereto;

a transverse end sealing wall closing the free end of the nipple portion;

said transverse end sealing wall including a recess formed internally of said wall and having a configuration adapted to receive the knob of an actuating stem;

a transversely extending shoulder portion joining the base portion to the nipple portion, with the portion of the shoulder next adjacent the nipple portion being axially extended in the free state into the interior of the tubular base portion in the direction of the free end thereof;

a locator ridge formed on said base portion at the free end thereof;

said ridge being formed on the external periphery of said base portion and comprising an axially extending outwardly tapering surface smoothly merging at its axially inner end with the cylindrical exterior of said base portion;

said transverse shoulder portion comprising a zone of reduced wall thickness sharply reduced relative to that of the remainder of the resilient sealing means, with the zone including as a part thereof the transverse shoulder portion and those sections of the nipple and base portions next adjacent the shoulder portion, with the cross sectional thickness of said shoulder portion being less than the cross sectional thickness of the wall of said base portion adjacent the axially inner end of said ridge on the free end of said base portion.

References Cited by the Examiner

UNITED STATES PATENTS

| | | | |
|---|---|---|---|
| 243,118 | 6/1881 | Garsed | 251—331 |
| 335,033 | 1/1886 | Locke | 137—795 |
| 1,818,973 | 8/1931 | De Giers | 251—335.2 X |
| 2,106,791 | 2/1938 | Brisson | 137—795 |
| 2,360,603 | 10/1944 | Ward | 251—331 X |
| 2,659,565 | 11/1953 | Johnson | 251—331 |
| 2,672,293 | 3/1954 | Ludlow. | |
| 2,874,929 | 2/1959 | Klingler | 251—335 X |
| 3,064,941 | 11/1962 | Stromberg | 251—335 X |

FOREIGN PATENTS

| | | |
|---|---|---|
| 1,054,675 | 10/1953 | France. |
| 1,065,238 | 9/1959 | Germany. |

ISADOR WEIL, *Primary Examiner.*

WILLIAM F. O'DEA, *Examiner.*